Figure 1:
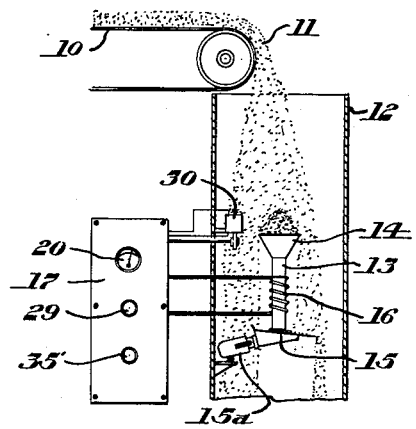

Dec. 7, 1954  H. E. CRINER  2,696,588
SURFACE MOISTURE DETECTION SYSTEM
Filed July 18, 1950

INVENTOR
HARRY E. CRINER

United States Patent Office 2,696,588
Patented Dec. 7, 1954

2,696,588

SURFACE MOISTURE DETECTION SYSTEM

Harry E. Criner, Pittsburgh, Pa., assignor to Heyl & Patterson, Inc., Pittsburgh, Pa., a corporation of Pennsylvania Application July 18, 1950, Serial No. 174,516

7 Claims. (Cl. 324—40)

This invention relates to the detection of surface moisture content of solid particles, and is of particular value for detecting surface moisture of coal particles and the like. For instance, when such particles emerge from a drier it is important to test their surface moisture in order to determine the proper heat input for the drier, since the temperature of the particles must not be allowed to rise excessively and a sharp rise in temperature follows immediately after evaporation of all of the surface moisture. Surface moisture testing is also important in connection with elimination of excess weight when coal or the like is to be transported.

The conventional method of determining surface moisture of particles of coal and the like is by comparison of the weight of samples of the particles before and after special drying operations. It is difficult to obtain an accurate measure of surface moisture when using this method, and the necessary separate tests for successive samples are time-consuming and expensive. There are other methods of determining the moisture content of particles, such as placing the particles between condenser plates and measuring the electrostatic effect of the moisture (see Eyer Patent No. 2,043,241), or measuring temperature changes of material subject to high-frequency electromagnetic forces (see Baver et al. Patent No. 2,343,520), but these testing methods fail to differentiate between the surface moisture and the internally-contained moisture of the tested particles.

In accordance with my invention, surface moisture on particles having lower electrical conductivity than the moisture thereon is determined by placing the particles in an oscillating electromagnetic field and measuring the reactance effect of the surface moisture, preferably by measuring the power loss in the field. The reactance effect or power loss is proportioned to the amount of surface moisture because a high frequency electromagnetic field induces more eddy currents around a particle having a relatively large amount of surface moisture than around a particle having less surface moisture, and the oscillation of these eddy currents governs the reactance and hence the power loss. The eddy currents on the surface of each particle do not penetrate into the interior of the particle to any appreciable extent and consequently the reactive effect and power loss effect is controlled only by surface moisture and not by the internal moisture of the particles being tested. As a result, the measuring system of my invention provides a very accurate measurement of surface moisture and has the further advantage of doing so instantaneously. Moreover, the electromagnetic field is conveniently set up within an induction coil which is open at both ends for passage of a continuous stream of particles therethrough so that a continuous indication of surface moisture content of a stream of particles may readily be obtained. A tube through the coil and tube discharge control means, such as a shaker plate spaced from the lower end of the tube, aid in obtaining a continuous indication of surface moisture of particles passing through the coil.

A self-excited oscillating circuit is preferably connected to the inductor for setting up a high-frequency electromagnetic field, and an electric meter registering power input into the circuit is the preferred indicator. The meter may be calibrated to register surface moisture at a glance when testing a continuous stream of particles. A potentiometer is preferably connected to the meter for zeroing its reading when calibrating the meter, and a variable shunt resistor is preferably connected to the meter for adjusting its sensitivity. The meter is preferably compensated against the effect of temperature variations on the conductivity of the surface moisture being tested by including as part of the shunt resistance some liquid like that of the surface moisture of the tested particles and by placing said liquid in a cell held out in the stream of tested particles. In this way the temperature of the cell varies with the temperature of the stream of particles and changes of moisture conductivity resulting from temperature changes are neutralized in their effect on the meter reading.

Figure 3:
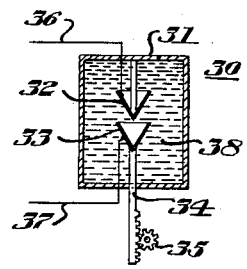
Figure 2:
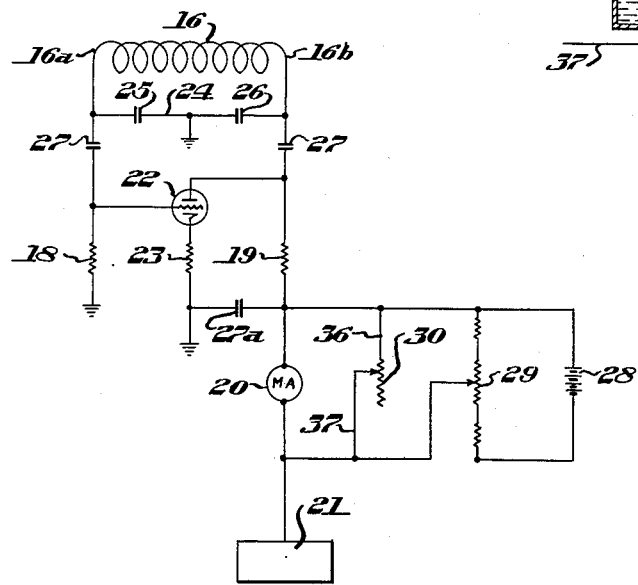

Other features, objects and advantages of the invention will become apparent from the following description and in the accompanying drawing. I have shown in the drawing, for purposes of illustration only, a present preferred embodiment of the invention, in which Figure 1 shows apparatus for continuously measuring surface moisture content of a stream of solid particles;

Figure 2 shows a diagrammatic circuit for the measuring apparatus of Figure 1; and Figure 3 shows details of a variable resistor cell in the circuit.

Referring now more particularly to the drawing and considering first the apparatus shown in Figure 1, there is provided a conveyor belt 10 discharging a stream of coal particles 11 down a chute 12 in which is mounted a tube 13 having a funnel 14 around its open upper end to catch some of the descending particles 11, and having a shaker plate 15 mounted adjacent its open lower end to control the rate of discharge of particles from the tube. The shaker plate 15 is actuated by a vibrator 15a regulated to discharge the particles at a rate less than the rate of feed into the funnel 14 so that the guide member 13 will remain full of particles constantly replenished from the stream of particles 11.

An inductance coil 16 is wound around the tube 13 with its terminals connected to electrical control and indicating apparatus shown at 17 in Figure 1. As shown in Figure 2, the inductance coil 16 is grounded at one end 16a through a resistor 18 and at its other end 16b is connected through a resistor 19 and ammeter 20 to a D. C. power source 21. A triode 22 has its grid connected between the coil end 16a and resistor 18, has its plate connected to the line between the coil end 16b and resistor 19, and has its negative terminal grounded through a resistor 23. A grounded line 24 is connected through a capacitor 25 with the coil end 16a and through a capacitor 26 to the coil end 16b to establish a resonant circuit which is under the control of the tube 22 and which is powered by the D. C. power source 21. Protective capacitors 27 and 27a are interposed in the circuit.

The ammeter 20 is connected in parallel with a potentiometer having a parallel battery 28 and variable resistor 29 for zeroing the reading of the ammeter 20. A variable shunt resistor 30 is also connected to the ammeter 20 for controlling its sensitivity.

The variable shunt resistor 30 is shown diagrammatically in Figure 2 and its preferred form is shown in Figure 3. The preferred form comprises a water-tight cell 31 in which is mounted a fixed metal cone 32 and a coaxial metal cone 33 carried by a rod 34 extending slidably through the cell 31 and axially movable by a micrometer device indicated generally at 35 and operated by a button 35' on the control apparatus (Figure 1). The cones 32 and 33 are normally spaced from each other by a few thousandths of an inch (the spacing being exaggerated in Figure 3) and are carried on insulated mountings with leads 36 and 37 connecting the respective cones in parallel with the ammeter 20. The cell 31 is preferably filled with water 38 from the same source as the surface moisture on the particles being tested, so that the conductivity characteristics will be the same, and is mounted adjacent the tube 13 within the main stream of particles 11 being discharged through the chute 12 (see Figure 1).

The apparatus shown in Figure 1 is calibrated by being tested with thoroughly dry particles at an average temperature while the resistor 29 is adjusted to give a zero reading on the ammeter 20. Similar particles having a known large amount of surface moisture are then passed through the chute 12 at the same temperature while the micrometer 35 is adjusted to give a desired reading of the ammeter 20 corresponding to the known amount of surface moisture. Thereafter, the ammeter will give a proportional indication of varying amounts of the same kind of surface moisture on a stream of similar particles, and changes in the temperature of the surface moisture will not materially affect the reading of the ammeter because the fluid in the cell 30 will also change temperature in the same way and thereby change the resistance of the resistor 30 in such a manner as to prevent the ammeter 20 from being influenced by surface moisture conductivity variations caused by temperature variations.

A specific example of the measuring apparatus, for example, has a coil 16 with an internal diameter of 2" and an inductance of 3.5 millihenries; capacitors 25 and 26 each of 10 mf.; capacitors 27 each of 70 mf. and capacitor 27a of 200 mf.; resistor 18 of 20 kilohms; resistor 19 of 10 kilohms; resistor 23 of 200 kilohms; D. C. power source 21 of 150 volts; cones 32 and 33 each of ¾" maximum diameter and 1" axial length; battery 30 of 6 volts; and a triode 22 (No. 955) giving a circuit frequency of $27 \times 10^6$ cycles per second. With this specific apparatus the surface moisture of coal particles has been measured down to ¼% of the dry weight of the particles, and surface moisture of ammonium sulphate particles has been measured down to .01% of the dry weight of the particles.

While I have shown and described a present preferred embodiment of the invention and method of practicing the same it will be recognized that the invention is not limited thereto but may be otherwise variously embodied within the scope of the following claims.

I claim:

1. Apparatus for continuous indication of the percentage of surface moisture on particles of coal and other solids of low conductivity, comprising a tube and an inductance coil therearound, means for feeding a stream of particles into the upper end of the tube, a shaker plate spaced adjacent the lower end of the tube to control the rate of outflow from the tube, an oscillating circuit connected to the coil, and a meter connected to the circuit to indicate reactive power loss resulting from the presence of surface moisture on particles passing through the tube.

2. A method of testing surface moisture of solid particles of lower conductivity than the moisture, comprising the steps of exciting an electromagnetic field of sufficiently high frequency to induce oscillating currents along the surfaces of said particles with substantially no internal currents appreciably below the surfaces, disposing said particles in said field, and measuring the power loss in said field while said particles are in it, thereby obtaining a measure for determining the surface moisture of said particles by comparison with corresponding test measurements of like particles having known surface moistures.

3. A method of testing surface moisture of coal particles comprising the steps of exciting an oscillating electromagnetic field with a frequency in the order of 26 megacycles, disposing said particles in said field, and measuring the power loss in said field while said particles are in it, thereby obtaining a measure for determining the surface moisture of said particles by comparison with corresponding test measurements of like particles having known surface moistures.

4. A method of continuously testing surface moisture of solid particles of lower conductivity than the moisture, comprising the steps of exciting an electromagnetic field of sufficiently high frequency to induce oscillating currents along the surfaces of said particles with substantially no internal currents appreciably below the surfaces, feeding a stream of said particles along a confined path extending through said field, releasing said particles from the confined path at a controlled rate relative to the rate of feed in order to maintain a column of particles in the field of substantially constant dimensions, and measuring the reactive power loss in said field resulting from the presence in the field of the particles in the confined path, thereby obtaining a continuous measure for determining the surface moisture of the particles traveling through the field by comparison with corresponding test measurements of like particles having known surface moistures.

5. Apparatus for continuously measuring the amount of surface moisture on solid particles of different conductivity than the moisture in a moving stream comprising means for exciting an electromagnetic field of sufficiently high frequency to induce oscillating current along the surfaces of the particles with substantially no internal currents appreciably below the surfaces, means for continuously feeding a stream of the particles into said field, means for continuously delivering the stream of particles from said field and means measuring the power loss in said field while the particles are in it, thereby obtaining a measure for determining the surface moisture of the particles by comparison with corresponding test measurements of like particles having known surface moistures.

6. Apparatus for continuously measuring the amount of surface moisture on solid particles of different conductivity than the moisture in a moving stream comprising means including a coil for exciting an electromagnetic field of sufficiently high frequency to induce oscillating currents along the surfaces of the particles with substantially no internal currents appreciably below the surfaces, means for continuously feeding a stream of the particles into said coil, means for continuously delivering the stream of particles from said coil and means measuring the power loss in said field while the particles are in it, thereby obtaining a measure for determining the surface moisture of the particles by comparison with corresponding test measurements of like particles having known surface moistures.

7. Apparatus for continuously measuring the amount of surface moisture on solid particles of different conductivity than the moisture in a moving stream comprising a tube, means including a coil wound about the tube for exciting an electromagnetic field of sufficiently high frequency to induce oscillating currents along the surfaces of the particles with substantially no internal currents appreciably below the surfaces, means for continuously feeding a stream of the particles into the tube, means for controllably continuously delivering the stream of particles from the tube and means measuring the power loss in said field while the particles are in it, thereby obtaining a measure for determining the surface moisture of the particles by comparison with corresponding test measurements of like particles having known surface moistures.

References Cited in the file of this patent

UNITED STATES PATENTS

| Number | Name | Date |
|---|---|---|
| 1,472,125 | Keeler | Oct. 30, 1923 |
| 1,610,971 | Ruben | Dec. 14, 1926 |
| 2,150,922 | Hay | Mar. 21, 1939 |
| 2,330,394 | Stuart | Sept. 28, 1943 |
| 2,337,231 | Cloud | Dec. 21, 1943 |
| 2,422,873 | Wolfner | June 24, 1947 |
| 2,505,778 | Limbach | May 2, 1950 |

FOREIGN PATENTS

| Number | Country | Date |
|---|---|---|
| 597,800 | Great Britain | Feb. 3, 1948 |